(12) United States Patent  
Gedela et al.

(10) Patent No.: US 11,456,451 B2
(45) Date of Patent: Sep. 27, 2022

(54) METHOD FOR PREPARING DRY ELECTRODE

(71) Applicant: NANOSPAN INDIA PRIVATE LIMITED, Hyderabad (IN)

(72) Inventors: Venkataramana Gedela, Korasavada (IN); Ravi Kanth Nuguru, Hyderabad (IN)

(73) Assignee: NANOSPAN INDIA PRIVATE LIMITED, Hyderabad (IN)

( * ) Notice: Subject to any disclaimer, the term of this patent is extended or adjusted under 35 U.S.C. 154(b) by 0 days.

(21) Appl. No.: 17/070,934

(22) Filed: Oct. 15, 2020

(65) Prior Publication Data

US 2021/0111394 A1    Apr. 15, 2021

(30) Foreign Application Priority Data

Oct. 15, 2019  (IN) .............................. 201941041648

(51) Int. Cl.
*H01M 4/04* (2006.01)
*H01M 4/1393* (2010.01)
*H01M 4/02* (2006.01)
*H01M 4/30* (2006.01)

(52) U.S. Cl.
CPC ....... *H01M 4/1393* (2013.01); *H01M 4/0435* (2013.01); *H01M 4/0404* (2013.01); *H01M 4/30* (2013.01); *H01M 2004/021* (2013.01)

(58) Field of Classification Search
CPC ............ H01M 4/0404; H01M 4/0435; H01M 4/1393; H01M 4/30; H01M 2204/021

USPC .................................. 156/242; 427/115, 122
See application file for complete search history.

(56) References Cited

U.S. PATENT DOCUMENTS

| 2009/0117467 A1* | 5/2009 | Zhamu | H01M 4/133 429/231.95 |
| 2010/0143798 A1* | 6/2010 | Zhamu | H01M 4/133 977/734 |
| 2014/0054490 A1* | 2/2014 | Sundara | H01B 1/04 252/503 |
| 2014/0103298 A1* | 4/2014 | Lee | G01K 15/005 257/29 |
| 2014/0255785 A1* | 9/2014 | Do | C09D 7/61 429/232 |
| 2017/0352868 A1* | 12/2017 | Zhamu | H01M 4/1393 |
| 2018/0269442 A1* | 9/2018 | Hsieh | H01M 4/5825 |
| 2019/0252131 A1* | 8/2019 | Zhamu | H01G 11/50 |
| 2019/0288260 A1* | 9/2019 | Delaporte | H01M 50/403 |
| 2020/0328403 A1* | 10/2020 | Jang | H01M 4/133 |
| 2021/0249657 A1* | 8/2021 | Shin | H01M 4/587 |
| 2022/0006071 A1* | 1/2022 | Petrowsky | H01M 4/62 |

* cited by examiner

*Primary Examiner* — Brian K Talbot

(57) ABSTRACT

A method for preparing a dry electrode is disclosed. The method comprises mixing of nanoparticles and graphene nanosheets in powder form to obtain a nanocomposite. The nanocomposite is compressed to obtain a compacted material, which is rolled to obtain a three dimensional graphene architecture framework (3D-GAF) active film. The 3D-GAF active film is laminated on a current collector to obtain a three dimensional graphene architecture framework dry electrode for next generation energy storage devices.

11 Claims, 2 Drawing Sheets

METHOD FOR PREPARING DRY ELECTRODE

BACKGROUND

Unless otherwise indicated herein, the materials described in this section are not prior art in this application and are not admitted to being prior art by inclusion in this section.

Field of the Invention

The subject described herein, in general, relates to energy storage devices. More particularly, but not exclusively, the subject matter relates to a process for preparing a three dimensional graphene based dry electrode used in energy storage devices.

Discussion of the Related Art

Energy storage devices such as batteries, fuel cells, and capacitors are widely used to provide energy. Different types of energy storage devices are made using different electrodes, electrolytes and other materials. Electrode is one of the most important components in the energy storage devices, which plays a vital role in determining the performance, life span, as well as the cost of the devices.

Conventionally, the electrodes used in the energy storing devices are fabricated by a wet coating process. A slurry prepared by mixing an electrode active material and a binder dissolved in solvents or an aqueous solutions is coated on a current collector. The current collector with the coating layer is further subjected to drying to remove the solvent from the electrode. Certain drawbacks are associated with such coating process such as, solvent toxicity, adhesion issue and corrosion. Secondly, the binder is dissolved into the electrolyte, due to which the particles in the electrode eventually lose contact to each other or to the current collector, which inevitably damages the energy storage device. Another drawback associated with such process is the removal of solvent from the electrode, which adds an additional cost to the manufacturing process.

Another conventional method includes coating a first wet slurry layer onto a current collector and a second wet slurry layer onto the first coated layer. Drawbacks associated with such process includes removal of solvent from the electrode, which is time consuming and well as involves higher manufacturing cost.

In light of the foregoing discussion, there is a need for an improved process that is cost effective, eco-friendly and addresses the aforementioned problems.

SUMMARY

A method for preparing a dry electrode is disclosed. The method comprises mixing of nanoparticles and graphene nanosheets in powder form to obtain a nanocomposite. The nanocomposite is compressed to obtain a compacted material. The compacted material is rolled to obtain a three dimensional graphene architecture framework (3D-GAF) active film. The (3D-GAF) active film is then laminated on a surface modified current collector to obtain a three dimensional graphene architecture framework dry electrode.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form part of the detailed description. The drawings show illustrations in accordance with example embodiments. These example embodiments are described in enough details to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

Method for Preparing Dry Electrode

Figure 1:
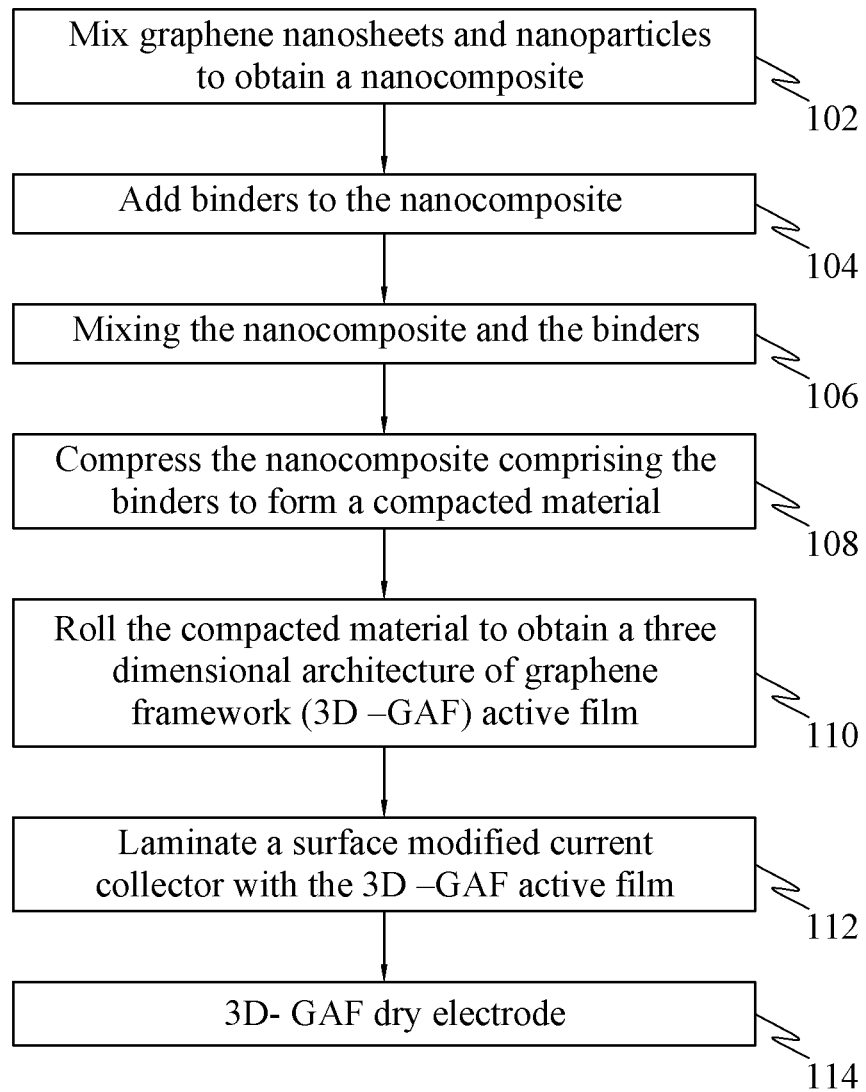
FIG. 1 is a flowchart explaining a process for preparing a dry electrode, in accordance with an embodiment.

Referring to FIG. 1, a method is provided for preparing dry electrode for energy storage devices. The electrode so prepared is a carbon nanostructured based dry electrode. At step 102, precursor materials i.e. graphene nanosheets (a carbon nanostructured material) and nanoparticles in powder form are mixed to obtain a nanocomposite. The graphene nanosheets disclosed are synthesized by an aqueous based exfoliation process from the raw materials such as graphite or exfoliated graphite (EG). It shall be noted that other forms of like graphitic material, graphene-containing materials, hard carbon, soft carbon, carbon nanotubes, porous carbon, and conductive carbon may also serve as raw materials for the synthesis of the graphene nanosheets.

In an embodiment, the nanoparticles may be metals, metal oxides or a combination of both. The metal or metal oxides may be for example, but not limited to, aluminum, aluminium oxide, tin, tin oxide (SnOx), manganese, manganese oxide (MnOx), molybdenum, molybdenum oxide (MoO2), nickel, nickel oxide (NiOx), copper, copper oxide (CuOx) and combinations thereof. It shall be noted that other metals or metal oxides that serves the purpose of the invention may also be used. In another embodiment, the nanoparticles may be silicon or silicon dioxide (SiOx).

The blending or mixing of the precursor materials may be accomplished by any dry powder blending process known in the art, such as, but not limited to air milling, ball-milling, tumbling-barrel mixing, and different types of conventional blenders.

In an embodiment, the mixing of the precursor materials is a dry process. Further, in this dry process, powders of different densities can be mixed together providing better contact between the powder particles.

The quality of the nanocomposite formed depends on various parameters such as mixing speed, mixing time and intensity of mixing. In an embodiment, the precursor materials are mixed at a speed ranging from 25 rpm (rotation per minute) to 50 rpm for two to four hours.

At step 104, one or more binders in dry form are added to the nanocomposite. Binders may include thermoplastics, resins, conductive polymers and fibril forming polymers. The binders are added to provide a strong bonding between the graphene nanosheets and the metal/metal oxides nanoparticles. Any other binders that serves the purpose of the invention may also be used. The binders added to the nanocomposite is solvent free, which means that binders are not dissolved in any solvent or aqueous solution prior to mixing.

At step 106, the binders and the nanocomposite comprising the graphene nanosheets and the metal/metal oxides nanoparticles are mixed together.

In the next step, at step 108, the nanocomposite comprising the binder is compressed to obtain a compacted material. The compacted material so obtained, has limited binding property due to cohesive nature of the particles.

In an embodiment, the nanocomposite comprising the binder is compressed or compact at a pressure ranging between 50 bar and 80 bar. The nanocomposite comprising the binder is compressed or compacted in a compression device, for example, but not limited to, in a hydraulic press (example of compressing device). Other compression device or compactor device well known in the art that serve the purpose of the invention may also be used.

At step 110, the compacted material is rolled in a hot roll pressing apparatus to form an active film of three dimensional (3D) architecture framework (3D-GAF) of graphene nanosheets and metal/metal oxide nanoparticles. During, the hot rolling process, the compacted material is heated to a temperature chosen between 100 degree celcius and 200 degree celcius.

In an embodiment, the compacted material, while being heated is rolled at a speed chosen between 10 mm/s and 40 mm/s.

In the next step, the 3D-GAF active film is then laminated on a surface modified current collector (at step 112) maintaining a laminating temperature ranging from 100 degree celcius to 200 degree celcius. The current collector to be used depends on the type of energy storage device selected. For example, in super capacitors aluminium foil is used as current collector, whereas in Li-ion battery copper foil is used as current collector. Other current collectors known in the art that serves the purpose of the invention can also be used.

Figure 2:
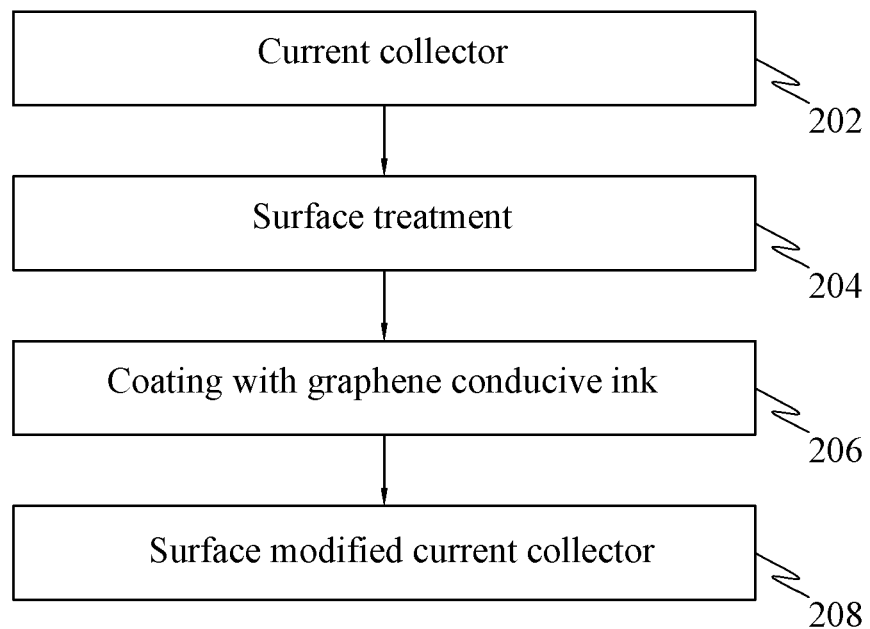
FIG. 2 is an exemplary flowchart explaining a surface modification process of a current collector, in accordance with an embodiment.

In an embodiment, the surface of the current collector is modified prior to the laminating process. Referring to FIG. 2, the surface of the current collector undergoes chemical or mechanical treatment (step 204). In the chemical treatment process, the surface of the current collector is treated with acids or chemical solvents. Other types of chemical treatments known in the art may also be used apart from acids and chemical solvents. Alternatively, in mechanical process the foil is modified by making perforations.

At step 206, the surface treated current collector is then coated with the graphene based conductive ink to obtain the surface modified current collector (step 208). The coating process is carried out by using techniques well known in the art, for example, but not limited to, a doctor blade technique or a gravure coating technique. The coating process decreases the ohmic resistance and also improves the adhesion between the 3D GAF active film and the surface modified current collector.

In an embodiment, the process of forming the active film is a dry fabrication process. The dry fabrication process refers to a solvent free process in which the precursor materials or any components used to form the active film are in the form of dry particles.

At step 114, a three dimensional architecture fabricated framework (3D-GAF) dry electrode is obtained on completion of the lamination process.

In an embodiment, the 3D-GAF dry electrode obtained is used in the energy storage device. Conventionally, the energy storage device comprises a first electrode and a second electrode. Each of these electrodes comprises a current collector. The current collector facilitates electrical coupling between the corresponding electrode and an external circuit. The energy storage device may be for example, but not limited, to a lithium ion battery or a supercapacitor. Other energy storage devices known in the art may also be included within the scope of the invention.

In an embodiment, the energy storage device must comprises at least one 3D-GAF dry electrode. In other words, at least one of the conventional electrodes in the energy storage device is replaced with the 3D-GAF dry electrode.

Fabrication of Supercapacitor

In supercapacitors, the positive and negative electrodes are replaced by the 3D-GAF dry electrodes. The 3D GAF dry electrodes are used as both positive and negative electrodes with a suitable separator and electrolyte.

Fabrication of Li-Ion Battery

The method steps explained in FIG. 1 for the preparation of the 3D-GAF dry electrode is also applicable for preparing a 3D GAF dry electrode used in Lithium ion battery (LIB). The only difference lies is in the selection of nanoparticles i.e. at step 102. In the preparation of the 3D-GAF dry electrode to be used in LIB, a specific nanoparticles i.e. silicon/silicon dioxide based nanoparticles is mixed with the graphene nanosheets. The silicon based 3D-GAF dry electrode so obtained is used as anode electrode with a suitable counter electrode, an electrolyte and a separator.

The counter electrodes used may be lithium nickel manganese cobalt oxide (NMC), a lithium manganese oxide (LMO), a lithium iron phosphate (LFP), a lithium cobalt oxide (LCO), a lithium titanate (LTO), a lithium nickel cobalt aluminum oxide (NCA), a layered transition metal oxide (LCO), Lithium nickel manganese cobalt oxide (NMC) and or Lithium nickel cobalt aluminum oxide (NCA), a spinel manganese oxide lithium manganese oxide (LMO), lithium manganese nickel oxide (LMNO), or combinations thereof. Further, the separators used may be polypropylene based or polyethylene based or trilayer separators or ceramic separators.

The method disclosed to prepare the dry electrode has several advantages compared to conventional wet slurry process. The 3D graphene architecture framework (3D GAF) based dry electrodes enhances the performance of the energy storage device by increasing the volumetric storage capacity due to high loading density and thick electrodes.

Further, no toxic solvents or any other organic liquids are used in the preparation method, hence, the 3D GAF based dry electrode decreases the overall weight of the energy storage device. As, the process used for preparing the electrodes is solvent free, the process is cost effective and reduces conductive blockage between the layers due to decreased loading of binder and increased active material loading.

The electrodes prepared by this method possess superior performance at a lower production cost. Additionally, the process uses high energy density, high power density, liquid sensitive materials which cannot be used in wet coating processes.

The 3D-GAF dry electrode prepared by said process, when used in the energy storage device decreases the internal resistance of electrode and the ESR (Equivalent Series Resistance) value of the device.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. A method for preparing a dry electrode, the method comprising:
    a) mixing of nanoparticles and graphene nanosheets to obtain a nanocomposite;
    b) compressing the nanocomposite to obtain a compacted material;
    c) rolling the compacted material to obtain a three-dimensional graphene architecture framework (3D-GAF) active film; and
    d) laminating a surface modified current collector with the three dimensional graphene architecture framework (3D-GAF) active film to obtain the dry electrode, wherein modification of the surface of the current collector comprises:
        a) surface treatment of the current collector; and
        b) coating the treated surface with a graphene based conductive ink.

2. The method as claimed in claim 1, wherein the method comprises adding one or more binders to the nanocomposite prior to the compressing process.

3. The method as claimed in claim 1, wherein the nanoparticles are selected from a group consisting of metal, metal oxides or a combination thereof.

4. The method as claimed in claim 3, where the nanoparticles are selected from a group consisting of, aluminum, aluminium oxide tin, tin oxide, manganese, manganese oxide, molybdenum, molybdenum oxide, nickel, nickel oxide, copper, copper oxide or combinations thereof.

5. The method as claimed in claim 1, wherein pressure maintained during the compressing process is between 50 bar and 80 bar.

6. The method as claimed in claim 1, wherein the surface treatment process is a chemical or mechanical process.

7. The method as claimed in claim 1, wherein the graphene nanosheets and the nanoparticles are mixed at a speed chosen between 20 rpm (rotation per minute) and 50 rpm for a time period chosen between 2 hours and four hours.

8. The method as claimed in claim 1, wherein the rolling temperature is chosen between 100 degree celsius and 200 degree celsius.

9. The method as claimed in claim 1, wherein the rolling speed is chosen between 10 mm/s and 40 mm/s.

10. The method as claimed in claim 1, wherein the temperature for laminating is chosen between 100 degree celsius and 200 degree celsius.

11. The method as claimed in claim 1, wherein the nanoparticle is silicon or silicon dioxide.

* * * * *